United States Patent [19]

Montagna et al.

[11] Patent Number: 5,376,289

[45] Date of Patent: Dec. 27, 1994

[54] LUBRICATING OILS AND GREASES

[75] Inventors: Laura Montagna, Milan; Ezio Strepparola, Bergamo, both of Italy; Michael Quallo, Allentown, Pa.

[73] Assignee: Ausimont S.p.A., Milan, Italy

[21] Appl. No.: 955,288

[22] Filed: Oct. 1, 1992

[30] Foreign Application Priority Data

Oct. 2, 1991 [IT] Italy .................. MI91A002608

[51] Int. Cl.$^5$ ................ C10M 107/00; C10M 137/00
[52] U.S. Cl. .................... 252/46.7; 252/48.4; 252/49.8; 252/49.9; 252/54; 72/42
[58] Field of Search ............ 252/48.4, 46.7, 49.9; 72/42

[56] References Cited

U.S. PATENT DOCUMENTS

| | | | |
|---|---|---|---|
| 3,306,855 | 2/1967 | Borecki et al. | 252/49.9 |
| 3,810,874 | 5/1974 | Mitsch et al. | 260/75 H |
| 4,097,388 | 6/1978 | Snyder, Jr. et al. | 252/49.9 |
| 4,308,063 | 12/1981 | Horiuchi et al. | 252/49.9 |
| 4,431,556 | 2/1984 | Christian et al. | 252/49.9 |
| 4,438,006 | 3/1984 | Snyder, Jr. et al. | 252/49.9 |
| 4,438,007 | 3/1984 | Snyder, Jr. et al. | 252/49.9 |
| 4,443,349 | 4/1984 | Snyder et al. | 252/49.9 |
| 4,472,290 | 9/1984 | Caporiccio et al. | 252/51.5 R |
| 4,681,693 | 7/1987 | Gavezotti et al. | 252/49.9 |
| 5,124,058 | 6/1992 | Corti et al. | 252/54 |
| 5,154,845 | 10/1992 | Williams | 252/48.4 |

FOREIGN PATENT DOCUMENTS

0435062A1 7/1991 European Pat. Off. .
1392457 12/1961 France .
61-254697 11/1985 Japan .

OTHER PUBLICATIONS

European Search Report dated Jul. 16, 1983 for EP9-2-116645.

English translation of Japanese Patent Application Publication No. 61-254697.

Primary Examiner—Ellen M. McAvoy
Attorney, Agent, or Firm—Maurice B. Stiefel; Elizabeth M. Barnhard

[57] ABSTRACT

The present invention relates to additives for lubricating oils and greases which endow said lubricating oils and greases extremely good performance characteristics under boundary lubrication conditions. Such additives are derivatives of monofunctional or difunctional perfluoropolyethers constituted by mercaptans, sulfides, disulfides, phosphines, phosphine-oxides and phosphoric acid triesters.

7 Claims, No Drawings

LUBRICATING OILS AND GREASES

The present invention relates to novel lubriating oils and greases.

Lubricating oils and greases based on perfluoropolyethers with perfluoroalkyl end groups are known. The properties of high heat stability and low volatility of these compounds makes it possible them to be used in mechanical systems which reach high temperatures. Under heavy mechanical conditions, these lubricants display limitations which are due to the high wear of lubricated metal surfaces; this problem was overcome by means of the addition of special anti-wear additives containing in their molecule a perfluoropolyether chain with particular functional end groups, as disclosed in European patent application 435062 A1 owned by the same Applicant.

Unfortunately, these additives do not make it possible for satisfactory results to be achieved under "boundary" lubrication conditions, also known as "extreme pressure" conditions (reference is made, for example, to the description of lubrication conditions in Kirk-Othmer, Encyclopedia of Chemical Technology, Third edition, 1981, page 479, Ed. John Wiley and Sons, or in the book by K. Klaman, "Lubricants", pages 38-foll., Verlag Chemie, 1984).

Under "extreme pressure" lubrication conditions, the extremely high pressure caused by moving metal parts, which come into contact with geometrically opposite, mating metal surfaces, is such that the lubricant film becomes discontinuous, so that seizure and metal surface welding phenomena may occur.

U.S. Pat. No. 3,306,855 discloses a lubricant based on a perfluoropolyether with perfluoroalkyl end groups to which a monoester or diester of phosphoric acid with an alcohol having perfluoropolyether structure is added as a corrosion inhibitor.

Japanese patent application 61-254,697, published on Nov. 12, 1986, discloses a grease containing a perfluoropolyether with perfluoroalkyl end groups, a metal powder or a metal oxide powder and a surface active agent (i.e., surfactant) constituted by a perfluoropolyether with different functional groups, among which the phosphoric functional group or phosphonic functional group, each containing at least one free P-OH acidic function. The surfactant prevents the oily component to separate from solid components during use. The grease can be used in order to lubricate gear wheels submitted to heavy loads. No information is supplied as to the suitability of said grease to act as a lubricant under extreme pressure conditions.

U.S. Pat. No. 4,681,693 discloses lubricating oils and greases based on perfluoropolyethers with perfluoroalkyl end groups, which contain a stabilizer additive constituted by a phosphine or a phosphine oxide, in which the phosphorus atom is bonded, though suitable bridging radicals, to three perfluoropolyether groups. This stabilizer inhibits the degradation of oils and greases in the presence of metals, as well as the corrosion of said metals when the lubricants are used in oxidizing, high-temperature environments. The patent only illustrates the stability of oils and greases under the above said conditions, without mentioning other possibilities of use.

The present Applicant found now, according to the present invention, that perfluoropolyether lubricants can be used in oils and greases under extreme pressure conditions, if to the perfluoropolyether lubricating oil with perfluoroalkyl end groups, novel additives are added which display a perfluoropolyether structure and contain particular functional groups, or said lubricating oil with perfluoroalkyl end groups is entirely replaced by these functional groups bearing perfluoropolyether compounds.

The present Applicant found also that these functional group-bearing perfluoropolyether compounds generally display a high antiwear and corrosion-preventing action.

The present Applicant found also that the same results are obtained with diphosphines and phosphine-oxides described in the above mentioned U.S. Pat. No. 4,681,693, in which the phosphorus atom is bonded, through suitable bridging radicals, with three perfluoropolyether groups.

Therefore, a purpose of the present invention is to provide novel lubricating oil compositions and novel lubricating grease compositions which can be used under extreme pressure conditions, and are generally endowed with high corrosion-preventing and anti-wear properties.

Another purpose is to provide a novel use, i.e., the use in lubrication under extreme pressure conditions, of perfluoropolyether oils and greases containing the above said perfluoropolyether-phosphines and -phosphine-oxides.

The first of these purposes is achieved by novel lubricating compositions which comprise:

(A) from 0.5 to 100% by weight of a perfluoropolyether compound selected from the group consisting of:

(1) AORY-SH           (I)

wherein

R is a perfluoropolyether or fluoropolyether chain having a number average molecular weight comprised within the range of from 500 to 10,000;

A is a perhaloalkyl end group, whose halogen atoms are constituted by either fluorine or fluorine and chlorine;

AOR represents:

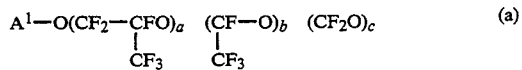

wherein $A^1$ contains from 1 to 3 carbon atoms, and the units with formulae

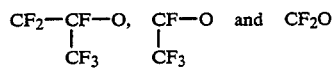

are randomly distributed along the chain; a, b and c are integers (wherein one from indices b and c may be zero), and the ratio of a/(b+c) is comprised within the range of from 5 to 40

wherein $A^2$ contains from 1 to 3 carbon atoms and k is an integer;

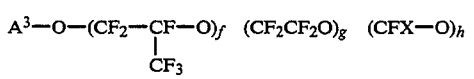
(c)

wherein $A^3$ contains from 1 to 3 carbon atoms; X is either F or $CF_3$; the units with formulae

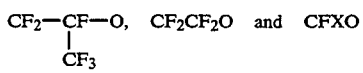

are randomly distributed along the chain; f, g and h are integers; the ratio of $f/(g+h)$ is comprised within the range of from 1 to 10, and the ratio of $g/h$ is comprised within the range of from 1 to 10;

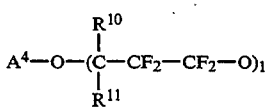
(d)

wherein $A^4$ contains from 1 to 3 carbon atoms; l is an integer and $R^{10}$ and $R^{11}$, which can be either the same, or different from each other, are selected from H, Cl and F; one fluorine atom in the $-CF_2-$ radicals can be replaced by H, Cl, a perfluoroalkoxy group or a perfluoroalkyl group; when said compound contains different

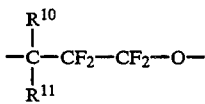

units, these units are randomly distributed along the chain; Y is a bridging radical selected from the group consisting of

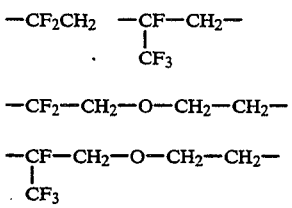

$-CF_2-CH_2-O-CH_2-CH_2-$

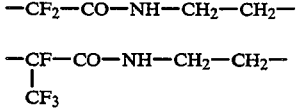

$-CF_2-CO-NH-CH_2-CH_2-$ $-CF-CO-NH-CH_2-CH_2-$
|
$CF_3$ (2) $(AORY)_2S$      (II)

wherein AOR and Y have the same meaning as disclosed above for compounds of formula (I)

(3) $(AORY)_2S_2$      (III)

wherein AOR and Y have the same meaning as disclosed for compounds of formula (I)

(4) $(AORYZ)_3P=Z$      (IV)

wherein Z is either O or S and AOR and Y have the same meaning as disclosed for compounds of formula (I)

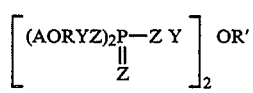
(V)

in which Z is either O or S and AOR and Y have the same meaning as disclosed for compounds of formula (I); R' is a perfluoropolyether chain having a number average molecular weight comprised within the range of from 500 to 10,000, selected from the group consisting of:

(a') $(C_2F_4O)_d (CF_2O)_e$ wherein the units with formulae $C_2F_4O$ and $CF_2O$ are randomly distributed along the chain, and d and e are integers, whose ratio, d/e, is comprised within the range of from 0.5 to 5

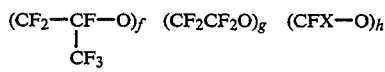
(b')

as disclosed under above (c) point

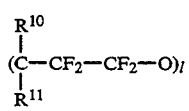
(c')

as disclosed under above (d) point.

(B) From 99.5% to 0% by weight of one or more perfluoropolyethers with perfluoroalkyl end groups.

Another object of the present invention consists in using, in lubrication under extreme pressure conditions, oily compositions comprising:

(A) from 0.5 to 100% by weight of perfluoropolyether compounds selected from the group consisting of:

(1) $(AORW)_3 P$      (VI)

in which AOR has the same meaning as reported above for compound (I); W is a bridging radical selected from the group consisting of

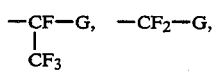

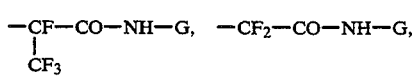

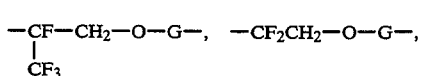

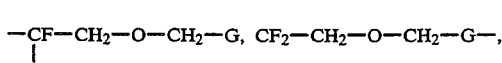

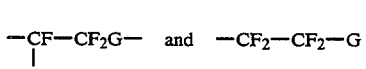

wherein G is a phenylene radical (commonly a paraphenylene radical), possibly substituted with one or more fluorine atoms (2) (AORW)₃P=O      (VII)

wherein AOR and W have the same meaning as indicated hereinabove for compound (VI)

(B) from 99.5% to 0% by weight of one or more perfluoropolyethers with perfluoroalkyl end groups.

Unless differently stated, all following explanations relate both to novel lubricating compositions containing the compounds with formulae (I), (II), (III), (IV), and (V), and to the novel use of compositions containing compounds with formulae (VI) and (VII).

As said, the number average molecular weight of perfluoropolyether chains R and R' is comprised within the range of from 500 to 10,000; preferably it is comprised within the range of from 600 to 3,000.

The coefficients indicated for the several perfluorooxyalkylene units such as, e.g., $(CF_2CF_2O)_d$ and $(CF_2O)_c$ relate to individual perfluoropolyether molecules and therefore have values equal to integers. As the perfluoropolyether substances are mixtures of molecules with different molecular weights, in such mixtures the average values of the coefficients will obviously have values which usually are different from integers.

The compounds

AORY—SH      (I)

are known from the prior art (reference is made, for instance, to U.S. Pat. No. 3,810,874), and can be prepared by starting from a perfluoropolyether with an alcoholic end group, such as, for example

—CF₂—CH₂—OCH₂—CH₂—OH (which can be obtained, for instance, according to the method as disclosed in U.S. Pat. Nos. 3,766,251 and 3,864,318), which the para-toluenesulfonic ester is prepared. By reaction with KHS, the desired compound is obtained.

Compounds (AORY)₂S      (II)

are novel. They can be prepared by reacting paratoluenesulfonic esters, as obtained as indicated hereinabove, with K₂S.

The compounds of formula (AORY)₂S₂      (III)

are novel. They can be prepared by starting from compounds of formula (I), by reacting them with Br₂.

The compounds of formula (AORYZ)₃P=Z      (IV)

are known. Those products in which Z is O can be prepared by starting from perfluoropolyethers with alcoholic end groups, such as, for example,

—CF₂—CH₂—OH.

The alcoholic precursor is reacted with POCl₃, in a molar ratio of 3:1, in the presence of an HCl acceptor, such as pyridine. A washing with water and an extraction with 1,1,2-trichloro-1,2,2-trifluoro-ethane yield the desired product. Those products in which Z is S are—obtained by analogous modalities.

From compounds of formula (IV), those compounds in which Z is oxygen, are preferred.

The compounds of formula

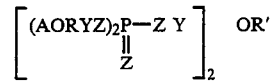

are novel.

Those products in which Z=O can be prepared through the precursor

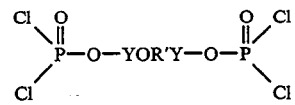

which is obtained from the corresponding diol (prepared, for example, by means of the method according to U.S. Pat. No. 3,810,874), by reaction with an excess of POCl₃, until developement of HCl ends, removing the excess of POCl₃, until the developement of HCl ends, and distilling off the excess of POCl₃.

The precursor is then reacted with a monofunctional perfluoropolyether alcohol in the presence of an hydrochloric acid acceptor.

Those compounds in which Z=S can be obtained by means of analogous modalities.

From compounds of formula (V), those in which Z is oxygen, are preferred.

The compounds of formulae (VI) and (VII) can be prepared by means of the method as disclosed in already cited U.S. Pat. No. 4,681,693.

The use of perfluoropolyethers with perfluoroalkyl end groups is well known in lubrication technique, as disclosed in a large number of documents, for example in European patent application 435,062 A1, already cited hereinabove.

When the perfluoropolyether derivatives with functional groups in accordance with the present invention are used as additives for perfluoropolyether oils with perfluoroalkyl end groups, they are preferably used in amounts comprised within the range of from 0.5 to 5% by weight (based on the mixture of both components), and more preferably of from 1 to 2%. However, the perfluoropolyether derivatives with functional groups can also be used as the only lubricant components, or they can be blended in any proportions with perfluoropolyethers with perfluoroalkyl end groups.

When the oils according to the present invention contain both component types, the lubricant composition is prepared by simply blending the components thereof.

When the compound with functional groups contains a perfluoropolyether or fluoropolyether chain of the following type:

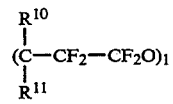

$R^{10}$ and $R^{11}$ preferably are fluorine or hydrogen atoms. As already said, one fluorine atom of the —CF₂— radicals can be replaced by H, Cl, a perfluoroalkoxy group, or a perfluoroalkyl group; in that case the perfluoroalkoxy will preferably contain from 1 to 4 carbon atoms, whereas the perfluoroalkyl group will preferably contain a same number of carbon atoms.

In the perhaloalkyl end group A, the halogen atoms are either fluorine or fluorine and chlorine atoms: in the latter case, the ratio of fluorine atoms to chlorine atoms is generally higher than 1. Perfluoropolyethers can be obtained, which contain perhaloalkyl end groups containing both Cl atoms and F atoms by operating, for example, according to the modalities as disclosed in European patent applications 340,740 A3, 344,547 A3 and 393,230 A3.

The lubricant greases according to the present invention generally contain from 10 to 40% by weight (preferably from 25 to 35%) of known thickeners, and from 90 to 60% (preferably from 75 to 65%) by weight, of the lubricating composition according to the present invention. In particular, those thickeners can be used which are disclosed in U.S. Pat. No. 4,941,987, assigned to the same Applicant.

Such a patent is incorporated with the disclosure of the present invention by reference.

Commonly, as thickeners for greases according to the present invention, polytetrafluoroethylene, silica, clay earths, graphite, zinc oxide, polyureas, polyethylene, polypropylene, polyamides, polyimides, organic pigments and soaps are used.

The use of polytetrafluoroethylene and silica is preferred.

To prepare the greases, the known methods can be used, for example that method can be used, which is disclosed in the above said U.S. patent.

The present invention also relates to methods to lubricate an apparatus in which moving metal parts apply onto geometrically opposite, mating metal parts a very high pressure, in particular such a pressure as to cause lubrication to be carried out under such conditions which fall within the range of "extreme pressure conditions".

A first method consists of using, as the lubricating oil, an oily composition, already disclosed hereinabove, which contains, as its (A) components, perfluoropolyether compounds of $$(AORW)_3P \qquad (VII)$$

or $$(AORW)_3P{=}O \qquad (VIII)$$

types.

A second method consists of using a grease which contains, as its oily components, the above said composition.

In order to evaluate the performance of oils and greases according to the present invention under extreme pressure conditions, the procedure of IP Standard 239/79 was used, which makes it possible for the following three main determinations to be carried out:

the initial seizure load, which is the load (expressed as kg), at which, in the 4-balls "extreme pressure" tester, a local melting occurs of the metal between the contacting surfaces, with consequent incipient seizure.

the welding load, which is the load (also expressed as kg), at which the metal melting between the contacting surfaces occurs on a large enough surface area as to cause the mutual welding of the 4 balls to occur.

the mean Hertz load, which is a number, expressed as load in kg, which expresses the trend of the whole diagram of wear as a function of load, by starting from lower loads then initial seizure load, up to welding load.

The higher the value of above said three load values, the better the behavior of lubricating oil or grease.

The wear resistance of lubricated surface was determined according to ASTM standard 4172/82B for oils, and according to ASTM standard 2266 for greases.

The corrosion resistance of lubricated surfaces was determined according to ASTM standard B117, but using demineralized water, instead of salt water. According to said last test, little carbon steel (C 15) (UNI) plates are previously cleaned and degreased by means of a pad which is first imbued with n-hexane and then with Delifrene ® 113 (trichlorotrifluoroethane). The dimensions of the utilized plates were $50 \times 100 \times 3$ mm.

On the surface of the plates—superficially pretreated as described before—there are spread a few grams of the oil to be evaluated and the oil is then uniformly distributed on the whole surface by means of a pad in such a way to cover the surface uniformly on both sides. The quantity of oil is then of 0.8 g on each side.

The plates are then hung in a fog chamber at 35° C., 100% of relative humidity, for a pre-established number of hours. The fog chamber consists of a sprayer operating by means of compressed air (pressure=2.5 atm.), connected with a water tank and capable of saturating the environment with moisture; the temperature control is adjusted at 35° C.

The tests reported herein were carried out using demineralized water and operating as follows: the plates were hung and treated in the fog chamber, which was maintained switched on during the pre-established duration of the test (16 hours; 24 hours).

The evaluation was then carried out.

The results of the tests were expressed according to the following classification:

a) no trace of rust is observed (0);
b) very few corrosion spots having diameter below 1 mm (1);
c) 30% of the surface is covered with little spots having diameter below 2 mm (2);
d) 60% of the surface is covered with little spots having diameter below 3 mm (3);
e) 100% of the surface is covered with large spots having diameter of 4–5mm, with the bright surface being visible in a few points (4);
f) 100% of the surface is covered with large stains: the underlying surface is not visible (5).

The evaluation does not consider the rust stains appearing in the area located up to 0.5 mm from the edges.

When the evaluation is (0), the result is to be considered as optimum; also evaluation (1) and (2) are good.

In the evaluation, two numbers are indicated: the first one relates to one face of the plate; the second one to the opposite face.

EXAMPLE 1

A lubricating oil is prepared by a simple blending, which is constituted by 99% by weight of a perfluoropolyether with perfluoroalkyl end groups and 1% by weight of an additive according to the present invention.

The first component has the formula

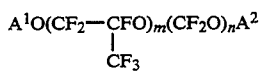
$$A^1O(CF_2-CFO)_m(CF_2O)_nA^2$$
$$\phantom{A^1O(CF_2-}|$$
$$\phantom{A^1O(CF_2-}CF_3$$

in which $A^1$ and $A^2$ are perfluoroalkyl radicals containing from 1 to 3 carbon atoms, whereas the ratio of m/n is of approximately 30. The viscosity of the fluid is of 250cSt at 20° C.

The second component has the average formula:

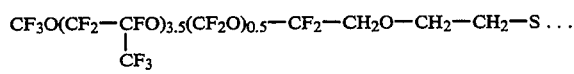
$$CF_3O(CF_2-CFO)_{3.5}(CF_2O)_{0.5}-CF_2-CH_2O-CH_2-CH_2-S\ldots \quad (VIII)$$
with $CF_3$ branch

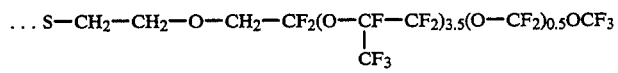
$$\ldots S-CH_2-CH_2-O-CH_2-CF_2(O-CF-CF_2)_{3.5}(O-CF_2)_{0.5}OCF_3$$
with $CF_3$ branch This component was prepared as follows:
20 g of the precursor

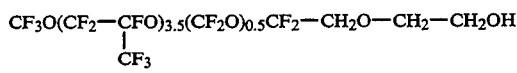
$$CF_3O(CF_2-CFO)_{3.5}(CF_2O)_{0.5}CF_2-CH_2O-CH_2-CH_2OH$$
with $CF_3$ branch was reacted with 6 g of para-toluene-sulfonyl chloride in ethyl ether at 0° C., in the presence of 3 g of pyridine. After a 2-hour reaction, the solvent is evaporated to dryness, the residue is washed with water and the tosyl derivative is extracted with 1,1,2-trichloro-1,2,2-trifluoroethane. After evaporating the solvent, 15 g of tosyl ether are reacted in 50 ml of dimethylformamide, with 2 g of KSH at 100° C., for 6 hours. The reaction mixture is poured into 200 ml of water, and the solution is extracted twice, each time with 30 ml of 1,1,2-trichloro-1,2,2-trifluoroethane. By evaporating the solvent, 11 g of residue is obtained, and 10 g thereof is reacted at 50° C. with 3 g of $Br_2$, during a 2-hour period. The reaction mixture is kept at the same temperature for a further hour. The excess of reactant is evaporated off: the residue is a liquid product which, on NMR analysis, IR analysis and elemental analysis for sulfur content, results to be the compound of formula (VIII).

The performance test under extreme pressure conditions gave the following results:
initial seizure load: 316 kg
welding load: >794 kg
mean Hertz load: 107 kg.

The value of 794 kg corresponds to the instrument limit.

A comparative test was made with a lubricating oil consisting only or the abovedescribed perfluoropolyether.

The results were the following:
initial seizure load: 224 kg.
welding load: 398 kg.
mean Hertz load: 115 kg.

EXAMPLE 2

A lubricating oil is prepared, which is constituted by 99% by weight of the same perfluoropolyether with perfluoroalkyl end groups of Example 1, and 1% by weight of an additive having the formula

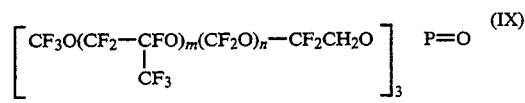
$$\left[ CF_3O(CF_2-CFO)_m(CF_2O)_n-CF_2CH_2O \right]_3 P=O \quad (IX)$$
with $CF_3$ branch The number average molecular weight of the perfluoropolyether chain

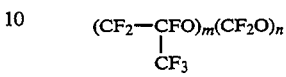
$$(CF_2-CFO)_m(CF_2O)_n$$
with $CF_3$ branch is of 750.

The ratio of m/n is of approximately 30.

Such an additive was prepared by reacting the precursor:

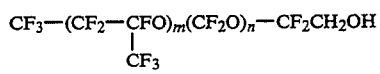
$$CF_3-(CF_2-CFO)_m(CF_2O)_n-CF_2CH_2OH$$
with $CF_3$ branch with $POCl_3$ in 1,1,2-trichloro-1,2,2-trifluoroethane at room temperature, in the presence of a stoichiometric amount of pyridine.

The performance test under extreme pressure conditions gave the following results:
initial seizure load: 316 kg
welding load: 447 kg
mean Hertz load: 126 kg.

EXAMPLE 3

A lubricating oil is prepared, which is constituted by 99% by weight of a perfluoropolyether with perfluoroalkyl end groups and 1% by weight of additive.

The first component has the formula:

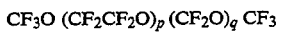
$$CF_3O\ (CF_2CF_2O)_p\ (CF_2O)_q\ CF_3$$

with a ratio of p/q of approximately 0.65, and a viscosity of 250 cSt at 20° C.

The second component has the formula:

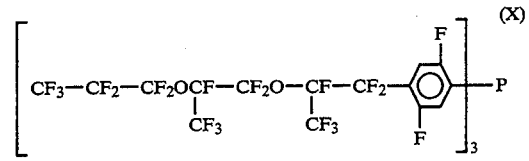
$$\left[ CF_3-CF_2-CF_2OCF-CF_2O-CF-CF_2-\underset{F}{\underset{|}{\bigcirc}}-\right]_3 P \quad (X)$$
with $CF_3$ branches This compound was prepared by means of the process as disclosed in U.S. Pat. No. 4,681,693.

The performance test under extreme pressure conditions gave the following results:
initial seizure load: 562 kg
welding load: 631 kg
mean Hertz load: 120 kg.

EXAMPLE 4

A lubricating oil is prepared which is constituted by 99% by weight of the same perfluoropolyether with perfluoroalkyl end groups of Example 1, and 1% by weight of the additive of formula:

$$CF_3O\ (CF_2\text{—}CF_2O)_{3.5}\ (CF_2O)_{0.5}\text{—}CF_2\text{—}CH_2O\text{—}CH_2\text{—}CH_2SH \qquad (XI)$$

In order to prepare this additive, the tosyl ether of Example 1 was reacted with KHS.

The performance test under extreme pressure conditions gave the following results:
initial seizure load: 282 kg
welding load: 631 kg
mean Hertz load: 107 kg.

The test of wear resistance of metal surfaces gave an average wear diameter of 0.65 mm. The same test carried out with the perfluoropolyether with perfluoroalkyl end groups alone gave a result of 0.84 mm.

COMPARATIVE EXAMPLES 5-6

In these examples some anti-wear additives disclosed in the already cited European patent application 435,062 A1 are used for comparison purposes.

The perfluoropolyether with perfluoroalkyl end groups is the same compound as of Example 1.

In test No. 5, the additive is the same as of Example 7 (3% by weight) of said patent application, having the formula:

$$CF_3\text{—}(CF_2O)_m(CF_2CFO)_s(CFO)_p\text{—}T \qquad (XII)$$
$$\hspace{3.5cm} | \hspace{0.8cm} |$$
$$\hspace{3.5cm} CF_3 \hspace{0.3cm} CF_3$$

Its number average molecular weight is of approximately 2,400. T represents the funtional groups:

$$\text{—}CF_2\text{—}C(OH)_2\text{—}CF_3$$

and $$\text{—}CF_2\text{—}COO^{-+}NH(CH_2\text{—}CH_2OH)_3$$

with s/p=10, s/m=20 and p/m=2.

In test number 6, the additive is the same as of Examples 1-5 (3% by weight) of the same patent application. Such an additive has the same perfluoropolyether structure as of additive of test No. 5 [formula (XII)], in which T represents the groups $$\text{—}CF_2\text{—}C(OH)_2\text{—}CF_3 \text{ and } \text{—}CF_2\text{—}COOH.$$

Its number average molecular weight is of 2,600.
The performance test under extreme pressure conditions gave the following results:

|  | additive No. 5 | additive No. 6 |
| --- | --- | --- |
| initial seizure load: | 220 kg | 282 kg |
| welding load: | 398 kg | 501 kg |
| mean Hertz load: | 115 kg | 108 kg. |

EXAMPLE 7

Following the method of U.S. Pat. No. 4,941,987, using that procedure in which a thickner powder is used as the starting material, a lubricating grease was prepared which was constituted by:

(1) 68% by weight of a perfluoropolyether with perfluoroalkyl end groups having the same structure as of Example 1, but a viscosity of 1,280 cSt at 20° C.

(2) 2% by weight of the same additive of formula (X) as of Example No. 3.

(3) 30% by weight of Algoflon ® L206 (polytetrafluoroethylene).

The NLGI degree of the grease is of 2.

The performance test under extreme pressure conditions, still carried out according to IP standard 239/79 gave the following results:
initial seizure load: 282 kg
welding load: >794 kg
mean Hertz load: 104 kg.

A comparative test was made with a similar grease not containing the additive of formula (X) and consisting of:
70% by weight of the abovedescribed perfluoropolyether
30% by weight of Algoflon L 206
The results were the following:
initial seizure load: 224 kg.
welding load: >794 kg.
mean Hertz load: 102 kg.

EXAMPLE 8

A grease was prepared which contains 68% by weight of the same perfluoropolyether with perfluoroalkyl end groups as of Example 7, 30% by weight of the same thickener as of Example 7, and 2% by weight of additive (VIII) of Example 1.

The NLGI degree of the grease is of 2.
The performance test under extreme pressure conditions, gave the following results:
initial seizure load: 355 kg
welding load: >794 kg
mean Hertz load: 108 kg.

EXAMPLE 9

Corrosion tests carried out according to the procedure described precendently were conducted on 4 oil samples: three of them (9A, 9B, 9C) are oils according to the present invention while the fourth (9D) does not belong to the invention. All the four samples contained the same perfluoropolyether with perfluoroalkyl end groups: Fomblin Y 25 ® of Ausimont, the product used in Example 1.

Test 9A

Sample: Fomblin Y 25: 98%, additive XI of example 4: 2%
Duration of the test: 16 hours
Corrosion evaluation: 1-2

Test 9B

Sample: Fomblin Y 25: 99%, additive X of example 3: 1%
Duration of the test: 16 hours
Corrosion evaluation: 1-2

Test 9C

Sample: Fomblin Y 25: 98%, additive IX of Example 2: 2%

| Duration of the test | Corrosion evaluation |
|---|---|
| 16 hours | 0–1 |
| 24 hours | 1–2 |

Test 9D

Sample: Fomblin Y 25: 100% (without additive)
Duration of the test: 16 hours
Corrosion evaluation: 5—5

We claim:
1. Lubricating oil compositions comprising:
(A) from 0.5 to 100% by weight of a perfluoropolyether compound selected from the group consisting of:

(1) AORY—SH    (I)

wherein
R is a perfluoropolyether or fluoropolyether chain having a number average molecular weight comprised within the range of from 500 to 10,000;
A is a perhaloalkyl end group, whose halogen atoms are constituted by either fluorine or fluorine and chlorine atoms;
AOR represents:

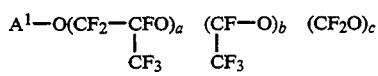    (a)

wherein $A^1$ contains from 1 to 3 carbon atoms, and the units with formulae

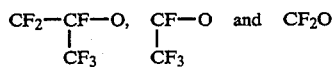

are randomly distributed along the chain; a, b and c are integers, wherein one from indices b and c may be 0, and the ratio of a/(b+c) is comprised within the range of from 5 to 40

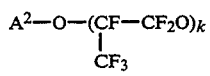    (b)

wherein $A^2$ contains from 1 to 3 carbon atoms and k is an integer;

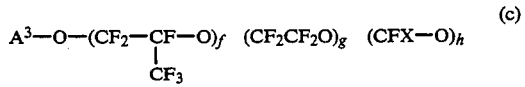    (c)

wherein $A^3$ contains from 1 to 3 carbon atoms; the units with formulae

are randomly distributed along the chain; f, g and h are integers; the ratio of f/(g+h) is comprised within the range of from 1 to 10, and the ratio of g/h is comprised within the range of from 1 to 10;

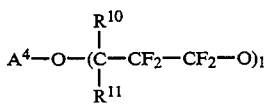    (d)

wherein $A^4$ contains from 1 to 3 carbon atoms; l is an integer and $R^{10}$ and $R^{11}$, which can be either the same, or different from each other, are selected from H, Cl and F; one fluorine atom in the —$CF_2$— radicals can be replaced by H, Cl, a perfluoroalkoxy group or a perfluoroalkyl group; when said compound contains different $$-\underset{\underset{R^{11}}{|}}{\overset{\overset{R^{10}}{|}}{C}}-CF_2-CF_2-O-$$

units, these units are ramdonly distributed along the chain; Y is a bridging radical selected from the group consisting of

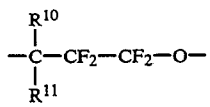

—$CF_2$—$CH_2$—O—$CH_2$—$CH_2$—

—CF—$CH_2$—O—$CH_2$—$CH_2$—
  |
  $CF_3$

—$CF_2$—CO—NH—$CH_2$—$CH_2$—

—CF—CO—NH—$CH_2$—$CH_2$—
  |
  $CF_3$ (2) $(AORY)_2 S$    (II)

wherein AOR and Y have the same meaning as disclosed above for compounds of formula (I)

(3) $(AORY)_2S_2$    (III)

wherein AOR and Y have the same meaning as disclosed for compounds of formula (I)

(4) $(AORYZ)_3 P=Z$    (IV)

wherein Z is either O or S and AOR and Y have the same meaning as disclosed for compounds of formula (I)

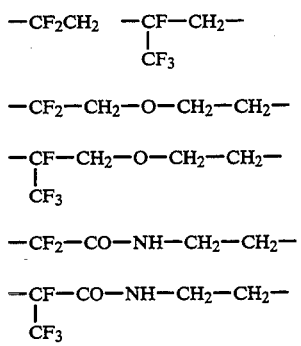    (V)

in which Z is either O or S and AOR and Y have the same meaning as disclosed for compounds of formula (I); R' is a perfluoropolyether chain having a number average molecular weight comprised within the range of from 500 to 10,000, selected from the group consisting of:

(a') 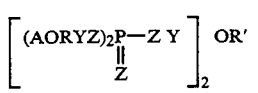

wherein the units with formulae $C_2F_4O$ and $CF_2O$ are randomly distributed along the chain, and d and e are integers, whose ratio, d/e, is comprised within the range of from 0.3 to 5

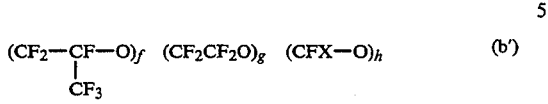  (b')

as described under above (c) point

  (c')

as described under above (d) point, (B) from 99.5% to 0% by weight of one or more perfluoropolyethers with perfluoroalkyl end groups.

2. Lubricating oil compositions according to claim 1, comprising from 0.5 to 5% by weight of (A) components and from 99.5 to 95% by weight of (B) components.

3. Lubricating greases comprising from 10 to 40% by weight of thickeners and from 90 to 60% by weight of an oily composition according to claim 1.

4. Perfluoropolyether or fluoropolyether compounds having the formula:

$(AORY)_2 S_2$  (III)

in which AOR and Y have the meaning described in claim 1.

5. A process for lubricating an apparatus with moving metal parts which operates under extreme pressure conditions, said process comprising lubricating the apparatus with an, oily composition comprising:

(A) from 0.5 to 100% by weight of perfluoropolyether compounds selected from the group consisting of (1) $(AORW)_3P$  (VI)

in which AOR has the meaning reported for compound (I) in claim 1 and W is a bridging radical selected from the group consisting of

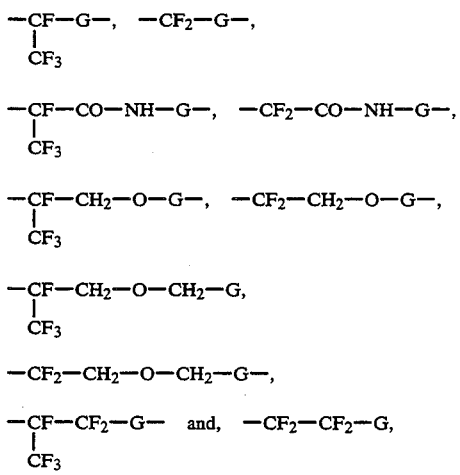

wherein G is a phenylene radical possibly substituted with one or more fluorine atoms, (2) $(AORW)_3P=O$  (VII)

wherein AOR and W have the same meaning as indicated hereinabove for compound (VI), and (B) from 99.5% to 0% by weight of one or more perfluoropolyethers having perfluoroalkyl end groups.

6. The process of claim 5, wherein the oily composition comprises from 0.5 to 5% by weight of (A) components and from 99.5% to 95% by weight of (B) components.

7. The process of claim 5, wherein the lubricant comprises from 10 to 40% by weight of thickeners and from 90 to 60% by weight of said oily composition.

* * * * *